United States Patent
Jones et al.

(10) Patent No.: US 9,051,902 B2
(45) Date of Patent: Jun. 9, 2015

(54) EGR PULSE MIXER FOR INTERNAL COMBUSTION ENGINE HAVING EGR LOOP

(71) Applicant: Southwest Research Institute, San Antonio, TX (US)

(72) Inventors: Guy M. Jones, San Antonio, TX (US); Anthony J. Megel, Cashion, OK (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 143 days.

(21) Appl. No.: 13/892,599

(22) Filed: May 13, 2013

(65) Prior Publication Data

US 2014/0331669 A1  Nov. 13, 2014

(51) Int. Cl.
  F02B 33/44 (2006.01)
  F02M 25/07 (2006.01)

(52) U.S. Cl.
  CPC ....... F02M 25/0722 (2013.01); F02M 25/0707 (2013.01); *Y02T 10/121* (2013.01)

(58) Field of Classification Search
  CPC ............... F02B 31/04; F02M 25/0707; F02M 25/0722; F02M 29/06; F02M 35/10222; F02M 35/10262; F02M 35/10118; F02M 35/112; Y02T 10/146; Y02T 10/121
  See application file for complete search history.

(56) References Cited

U.S. PATENT DOCUMENTS

| | | | | |
|---|---|---|---|---|
| 2,354,179 A | * | 7/1944 | Blanc | 123/568.17 |
| 6,609,374 B2 | * | 8/2003 | Feucht et al. | 60/602 |
| 7,552,722 B1 | * | 6/2009 | Shieh et al. | 123/568.17 |
| 7,624,575 B2 | | 12/2009 | Noelle et al. | |
| 8,056,340 B2 | | 11/2011 | Vaught et al. | |
| 2003/0085071 A1 | * | 5/2003 | Boast et al. | 181/249 |
| 2007/0271921 A1 | * | 11/2007 | Chen | 60/605.2 |
| 2011/0030372 A1 | * | 2/2011 | Ooshima et al. | 60/605.2 |
| 2011/0162360 A1 | * | 7/2011 | Vaught et al. | 60/605.2 |
| 2011/0173954 A1 | * | 7/2011 | Wenzel | 60/274 |
| 2011/0265772 A1 | | 11/2011 | Teng et al. | |

* cited by examiner

*Primary Examiner* — Jesse Bogue
(74) *Attorney, Agent, or Firm* — Chowdhury & Georgakis PC; Ann C. Livingston

(57) ABSTRACT

A mixer, for use with an internal combustion engine, for mixing EGR gas from an EGR loop with fresh air from the engine's fresh air intake. The mixer has an outer shell having the general shape of a thin-shelled hollow cylinder with a side entry port. One end of the cylinder provides a straight entry port and the other end of the cylinder provides a straight exit port. An inner sleeve fits inside the outer shell such that a space is provided between the inner sleeve and the outer shell, and a passageway is formed inside the inner sleeve through the length of the mixer. The inner sleeve has a series of flow ribs extending from its outer surface within the space, and has entry holes for providing fluid communication from the space into the passageway.

19 Claims, 3 Drawing Sheets

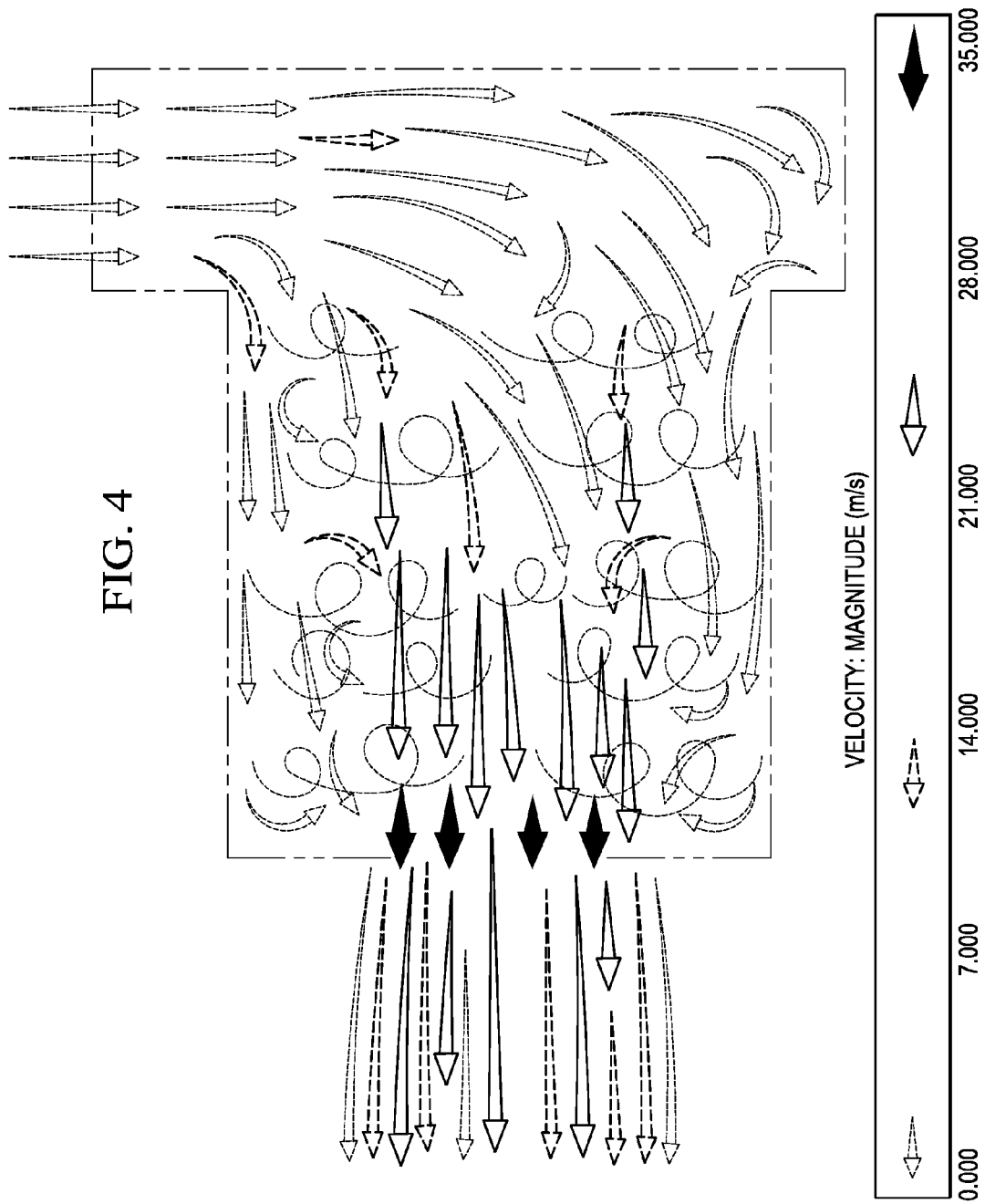

EGR PULSE MIXER FOR INTERNAL COMBUSTION ENGINE HAVING EGR LOOP

TECHNICAL FIELD OF THE INVENTION

This invention relates to internal combustion engines, and more particularly to exhaust gas recirculation systems.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop when boosting with a turbocharger, depending on whether the recirculated exhaust is introduced to the intake post compressor (high pressure loop) or pre-compressor (low pressure loop).

EGR has a long history of use in both diesel and spark-ignited engines. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, reducing the amount of exhaust gas produced.

As a relatively simple and low cost technology, EGR can be expected to be widely used on all types of engines. Of particular interest is that EGR can reduce the need for fuel enrichment at high loads in turbocharged engines and thereby improve fuel economy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates flow paths of the EGR gas within the mixer, as well as the venturi effect of the mixer.

DETAILED DESCRIPTION OF THE INVENTION

The following description is directed to a mixer particularly suited for use with an internal combustion engine having dedicated EGR. In a "dedicated EGR" engine, one or more, but not all, of the engine's cylinders are used to generate exhaust gas, all of which is recirculated to the intake charge of the engine.

The dedicated EGR may be produced by a cylinder having a single exhaust port that opens only to an EGR loop. The other cylinders produce "normal" exhaust, i.e., exhaust that exits the engine via the tailpipe. U.S. Pat. No. 8,291,891, entitled "EGR System with Dedicated EGR Cylinders", to Alger, et al., describes a system that generates dedicated EGR in this manner and is incorporated by reference herein.

A feature of dedicated EGR is that the composition of the dedicated EGR exhaust gas may be controlled to be different from that of the exhaust of the non-dedicated cylinders. For example, the dedicated EGR cylinder(s) may be run more rich to provide EGR that improves combustion on all cylinders.

The description below is specifically directed to a mixer for mixing the dedicated EGR with fresh air from the engine's fresh air intake system. As explained below, the mixer provides uniform time-domain mixing of dedicated EGR with fresh air to provide consistent continuous combustion input to the internal combustion engine.

The mixer could also be used with conventional EGR systems (non dedicated EGR). However, it is especially designed for EGR systems in which the EGR gas tends to be delivered in pulses more than as a steady stream.

Figure 1:
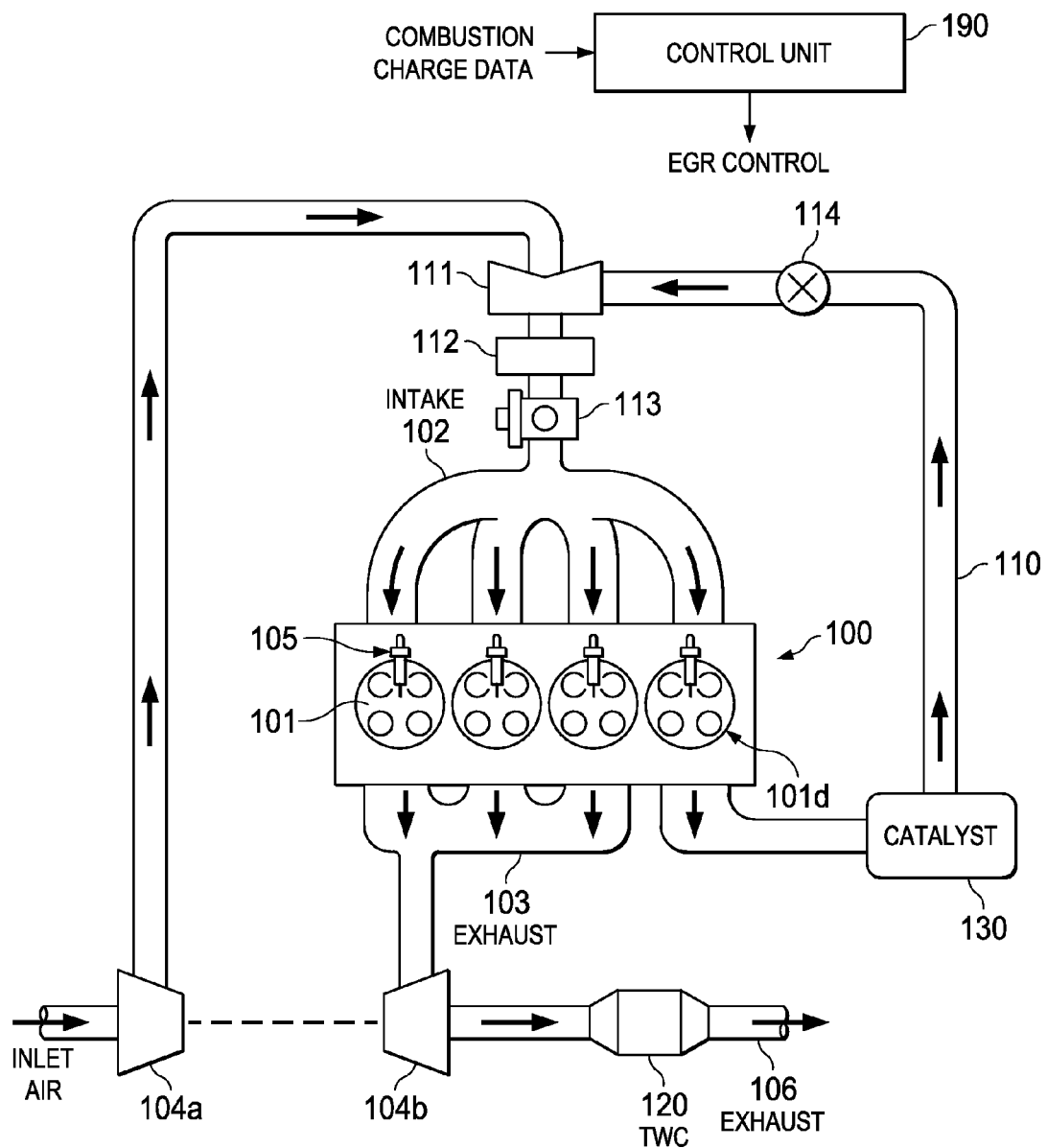
FIG. 1 illustrates an internal combustion engine having a dedicated EGR cylinder and an EGR mixer in accordance with the invention.

FIG. 1 illustrates a spark-ignited internal combustion engine 100 having four cylinders 101. One of the cylinders 101 is a dedicated EGR cylinder, identified as cylinder 101*d*.

The dedicated-EGR cylinder 101*d* has all of its exhaust recirculated back to the intake manifold 102 via an EGR loop 110. The exhaust of the other three cylinders 101 (referred to herein as the "main" or "non dedicated" cylinders) is directed to the engine's main exhaust system via an exhaust manifold 103. In this example, the engine is said to have "25% dedicated EGR" because one of its four cylinders has all of its exhaust redirected to the intake manifold 102. In other embodiments, there may be a different number of engine cylinders 101, and/or there may be more than one dedicated EGR cylinder 101*d*. As stated above, in general, in a "dedicated EGR" engine configuration, all of the exhaust of a sub-group of cylinders is routed back to the engine intake.

Each cylinder 101 has an associated spark plug 105 or other igniter. The remainder of the ignition system is not explicitly shown, but any suitable ignition system, known or to be developed, may be used.

Engine 100 is equipped with a turbocharger, specifically a compressor 104*a* and a turbine 104*b*. In other embodiments, engine could be equipped with a supercharger or have some other boosted or non boosted intake system.

Although not explicitly shown, the cylinders 101 have some sort of fuel delivery system for introducing fuel into the cylinders. This fuel delivery system can be fumigated, port injected, or direct injected.

The EGR exhaust is recirculated via an EGR loop 110. A catalyst 130, optionally placed along the EGR loop 110 can be used to increase the H2 in the EGR stream by reforming fuel injected into the EGR loop. An example of a suitable catalyst 130 is a water gas shift catalyst. An EGR valve 114 may be used to control the intake into the EGR cylinder 101*d*. In other embodiments, variable valve timing may be used to control EGR flow.

The EGR loop 110 joins the intake line at a mixer 111, described in further detail below. The mixture of EGR gas and fresh air is cooled with a cooler 112. A throttle 113 is used to control the amount of intake into the intake manifold 102.

The engine's non-dedicated EGR cylinders 101 may be operated with any air-fuel ratio appropriate for the engine and its operating conditions. In the example of this description, the non-dedicated EGR cylinders are assumed to run stoichiometrically, allowing the use of a three way catalyst 120 as the exhaust aftertreatment device.

The dedicated EGR cylinder 101*d* can operate at any equivalence ratio because its exhaust will not exit the engine before passing through a non-dedicated EGR cylinder 101.

For overall improvement of engine performance, it may be desired to run the dedicated EGR cylinder rich of stoichiometric.

In the example of FIG. 1, EGR loop 110 is a high pressure loop. In an engine equipped with a high-pressure EGR loop, the exhaust to be recirculated is extracted upstream of the turbocharger's turbine 103 and routed to the engine intake downstream of the turbocharger's compressor 104a. An EGR system may also be implemented as a low-pressure loop, in which the exhaust to be recirculated is extracted downstream of the turbine and introduced to the engine inlet upstream of the compressor.

The EGR system has a control unit 190, which may be dedicated to EGR control or may be part of a more comprehensive engine control unit (ECU). Control unit 190 may be implemented with conventional processing and memory devices.

In operation, after entering the cylinders 101, the fresh-air/EGR mixture is ignited and combusts. After combustion, exhaust gas from each cylinder 101 flows through its exhaust port and into exhaust manifold 103. The exhaust of the dedicated EGR cylinder 101d is recirculated back to the intake manifold 102 via the dedicated EGR loop 110. The exhaust from the main cylinders flows through turbine 104b and out the tailpipe 106.

If the dedicated EGR cylinder 101d is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as low speed and high torque, due to increased EGR tolerance and the knock resistance provided by hydrogen (H2) and carbon monoxide (CO).

As stated above, in the example of this description, engine 100 is spark-ignited, with each cylinder 101 having an associated spark plug (not shown), and its "normal" air-fuel ratio is stoichiometric. However, the methods described herein are also suitable for use with compression ignited engines.

EGR Mixer

Mixer 111 is especially designed to provide the engine cylinders with EGR gas that is distributed over time. More specifically, what would otherwise be highly-concentrated EGR gas bursts instead enters the combustion intake stream as a steady, consistent flow. As explained below, mixer 111 receives EGR pulses from EGR loop 110, and modifies the pulses to a near-steady flow mixed with fresh air. It is especially designed to mix EGR gases with fresh intake air in the time domain.

Figure 2:
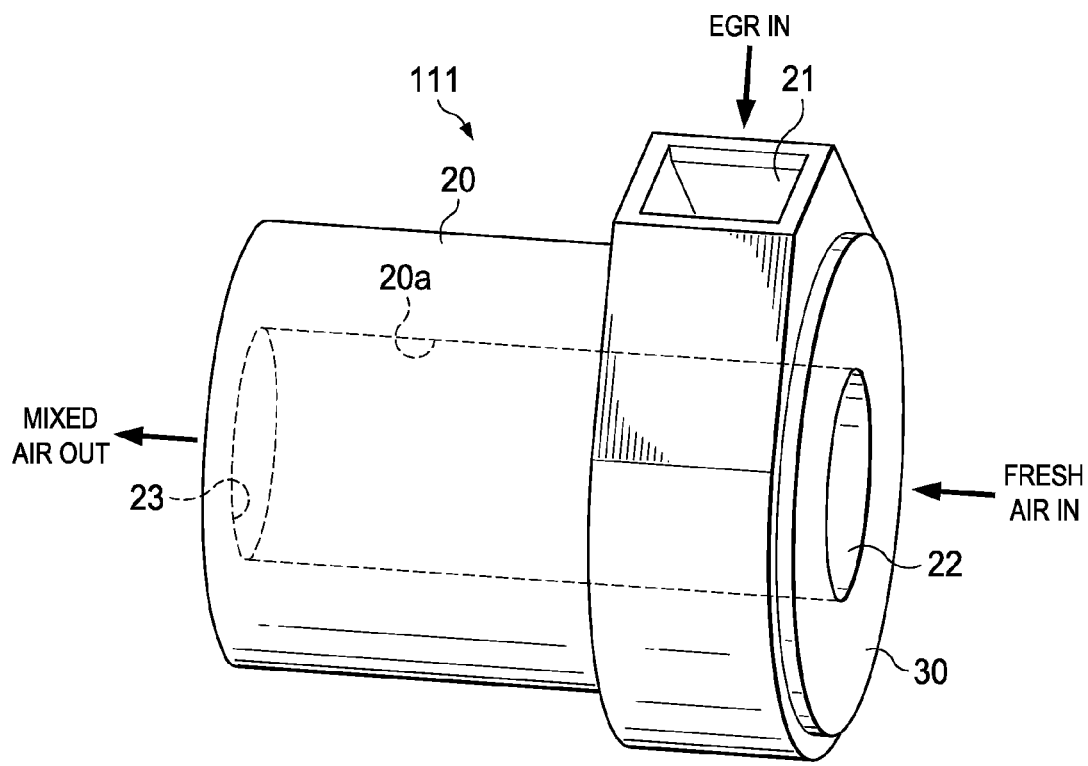
FIG. 2 is a perspective view of the mixer.

FIG. 2 is a perspective view of mixer 111, designed to break up bursts of EGR gas from EGR loop 110 into a near-steady stream. The overall geometry of mixer 111 is that of a hollow cylinder. A longitudinal inner passage 20a through the cylinder has a fresh air inlet 22 on one end and a mixed air outlet 23 on the other end. A side inlet 21 is in fluid communication with the inner passage 20a at or near the fresh air inlet 22.

Thus, mixer 111 has a side-entry EGR inlet 21, a straight-entry fresh air inlet 22, and a straight-exit mixed air outlet 23. The "side-entry" feature of EGR inlet 21 is meant in the broadest sense, and could also mean an entry that is axially offset.

Figure 3:
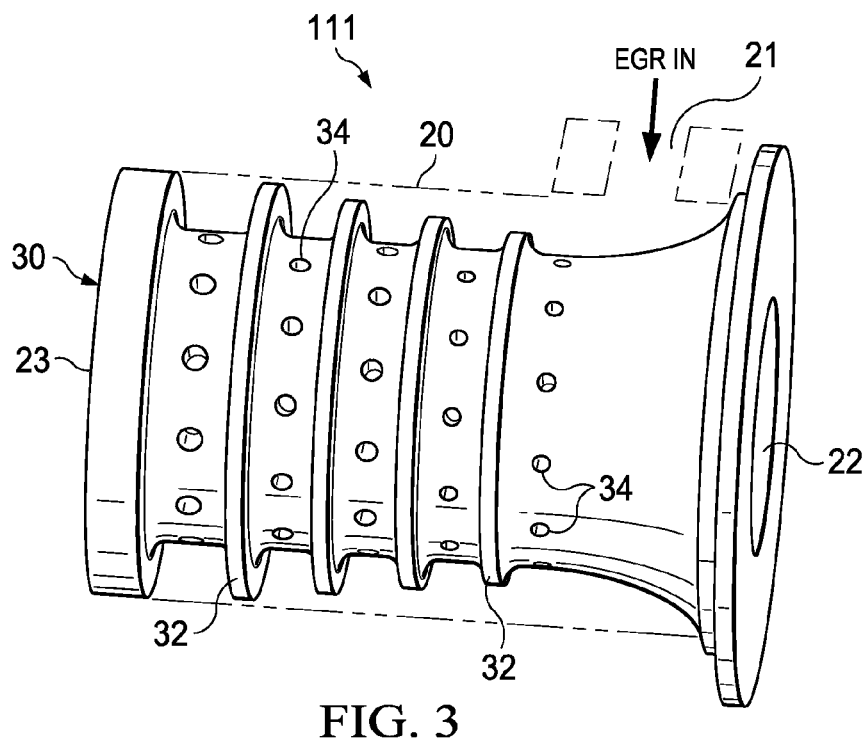
FIG. 3 illustrates the mixer, and in particular an internal sleeve within the mixer.

FIG. 3 illustrates mixer 111, and in particular an internal sleeve 30 within mixer 111. The outer shell 20 shown in FIG. 2 is represented with dotted lines, and has the shape of a thin hollow cylinder except at EGR inlet 21.

Thus, referring to both FIGS. 2 and 3, mixer comprises an outer shell 20 and an inner sleeve 30. The inner sleeve 30 fits inside the outer shell 20, such that the inlet and outlet of the inner sleeve correspond with the inlet and outlet ends of the outer shell 20. In other words, the inner sleeve 30 fits inside the outer shell 20 to form one continuous and straight inner passage 20a through the length of mixer 111.

The outer circumference of the inner sleeve 30 is smaller than the inner circumference of the outer shell 20. As a result, an empty space is provided between the inner sleeve and the outer shell inside the mixer.

As indicated, EGR gas enters via the EGR inlet 21. The EGR gas circulates within the space between the outer surface of sleeve 30 and the inner surface of shell 20. It then passes through entry holes 34 of the inner shell 30 into passageway 20a.

In addition to entry holes 34, inner shell 30 has flow ribs 32 on its outer surface. Other than flow ribs 32, the outer surface of inner sleeve is generally cylindrical having substantially the same diameter from its inlet end to its outlet end. An exception is at the fresh air inlet end of inner sleeve 30, where the outer surface of inner sleeve 30 is gently tapered toward the inner surface of the outer shell 20.

In the example of FIG. 3, flow ribs 32 protrude perpendicularly from the outer surface of inner sleeve 30, each rib extending around the circumference of the inner sleeve 30. In other embodiments, the flow ribs may extend from the surface of the inner sleeve 30 at an angle. For example, they may be angled back toward the inlet port.

Further in the example of FIG. 3, flow ribs 32 are graduated in height, with the flow rib 32 closest to the inlet 22 being shorter than the flow rib 32 closet to the outlet 23. In other words, the flow ribs 32 have progressive diameters. The tallest flow rib 32 does not extend entirely to the inner surface of shell 20 so that incoming EGR gas can circulate the entire space between outer shell 20 and inner sleeve 30.

Other configurations of the flow ribs are possible, with a common feature being that flow ribs 32 being functional to block and collect the EGR flow. The series of flow ribs 32 allows some EGR flow to pass, while collecting other EGR flow. In the example of FIG. 3, flow ribs 32 are parallel and separate ribs, each around the entire circumference of the inner sleeve. In other embodiments, flow ribs 32 could be connected, such as being formed with one or more spiral ribs, continuous or disconnected, that run down the length of inner sleeve 30. Various configurations of flow ribs could be used, with the common feature being that they extend upwardly from the outer surface of the inner sleeve 30.

In the example of this description, entry holes 34 are arranged such that between each rib 32, there is a row of entry holes 34 evenly spaced around the circumference of the inner sleeve. However, other arrangements, random or evenly spaced, of the entry holes 34 are possible. For example, the entry holes could be arranged in an arc partially around the circumference of the inner sleeve 30, and these arcs could be rotated relative to each other.

Both outer shell 20 and inner sleeve 30 are made from materials appropriate for engine components. Typically, these materials will be metals, which are rigid and sufficiently durable to withstand the high temperatures, corrosion, and prolonged use of engine use.

In operation, the inner passage of inner sleeve 30 forms a venturi. EGR gas flows around and past flow ribs 32 and through entry holes 34 in order to enter the venturi, where it mixes with fresh air from fresh air inlet 22. The mixture of EGR and fresh air exits out of the exit port 23, and eventually enters the intake manifold 102, via whatever throttles or valves might be in between.

Simulated flow analysis of a burst of particles entering mixer 111 shows that the venturi formed within mixer 111 increases the velocity of the incoming intake air. This lowers the pressure inside the venturi and draws EGR gas into the mixed flow stream. A burst of particles that enters at inlet 21 will exit at different times, and thus form a steady stream over a longer time past the burst period.

FIG. 4 illustrates flow paths of the EGR gas within mixer 111, and well as the venturi effect of the mixer 111. FIG. 4 specifically illustrates how the flow ribs 32, having progressive diameters, create virtual "runners" for the EGR flow path. This allows some EGR flow to enter the venturi and exit the system quickly, while other EGR flow travels a greater distance before entering the venturi. Because velocity is lower outside the venturi, flow across longer "runners" waits more time in residence before exiting the mixer. This effectively dampens EGR pulses entering mixer 111.

In another embodiment, flow rib structures may be designed in a helical fashion, creating an immediate channel that guides the EGR flow around the perimeter of the venturi toward the outlet. Within this helical channel, entry holes allow EGR flow into the venturi, where it would be mixed with incoming fresh air and immediately carried through the outlet port.

In still another embodiment, flow ribs may be made to prevent EGR flow from passing over them. For example, the flow ribs could extend across the space between the inner sleeve and outer shell. Cutouts in the flow ribs would be spaced radially to act as a maze, causing some EGR flow to have to move both radially as well as axially toward the outlet. Entry holes would allow some of the flow through to the venturi to mix with fresh air and be carried to the outlet.

What is claimed is:

1. A mixer, for use with an internal combustion engine, for mixing EGR gas from an EGR loop with fresh air from the engine's fresh air intake, comprising:
    an outer shell having the shape of a hollow cylinder with a side entry port, with one end of the cylinder providing an intake air entry port and the other end of the cylinder providing an intake air exit port;
    a inner sleeve having a generally cylindrical shape, positioned inside the outer shell having an entry end that aligns with and fits within the intake air entry port and having an exit end that aligns with and fits within the intake air exit port, such that the inner sleeve provides a passageway through the mixer;
    wherein the outer circumference of the inner sleeve is smaller than the inner circumference of the outer shell, such that a space is provided between the inner sleeve and the outer shell inside the mixer;
    wherein the inner sleeve has one or more rows of flow ribs extending from its outer surface within the space over which air flows, each row extending traverse to the axial length of the inner sleeve; and
    wherein the inner shell further has entry holes for providing fluid communication from the space into the passageway.

2. The mixer of claim 1, wherein the flow ribs each extend the same distance from the surface of the inner sleeve.

3. The mixer of claim 1, wherein the flow ribs extend progressively further from the surface of the inner sleeve.

4. The mixer of claim 1, wherein the flow ribs extend perpendicularly from the surface of the inner sleeve.

5. The mixer of claim 1, wherein the flow ribs extend from the surface of the inner sleeve at an angle.

6. The mixer of claim 1, wherein the flow ribs are separate and parallel to each other.

7. The mixer of claim 1, wherein the flow ribs are formed from at least one spiral rib extending from the outer surface of the inner sleeve.

8. The mixer of claim 1, wherein the mixer is operable to receive bursts of EGR gas and expel a near steady stream of mixed EGR gas and fresh air.

9. The mixer of claim 1, wherein the EGR loop is a dedicated EGR loop.

10. The mixer of claim 1, wherein the flow ribs extend completely across the space and have openings for allowing EGR gas to flow through the flow ribs.

11. A method of mixing EGR from an EGR loop with fresh air for subsequent introduction into the intake manifold of an internal combustion engine, the engine having a turbocharger with a compressor, comprising:
    connecting a mixer to the EGR loop, to a fresh air intake line downstream the compressor, and to a mixed output line upstream the intake manifold;
    wherein the mixer has an outer shell having the shape of a hollow cylinder with a side entry port to receive the EGR gas via the EGR loop, with one end of the cylinder providing an intake entry port to receive the fresh air and the other end of the cylinder providing an intake exit port to exhaust the mixed output;
    a inner sleeve having a generally cylindrical shape, positioned inside the outer shell having an entry end that aligns with and fits within the intake entry port and having an exit end that aligns with and fits within the intake exit port, such that the inner sleeve provides a passageway; wherein the outer circumference of the inner sleeve is smaller than the inner circumference of the outer shell, such that a space is provided between the inner sleeve and the outer shell;
    wherein the inner sleeve has one or more rows of flow ribs extending from its outer surface within the space over which air flows, each row extending traverse to the axial length of the inner sleeve; and
    wherein the inner shell further has entry holes for providing fluid communication from the space into the passageway;
    wherein the mixer is operable to receive bursts of EGR gas and to expel a near steady stream of mixed EGR gas and fresh air.

12. The method of claim 11, wherein the flow ribs each extend the same distance from the surface of the inner sleeve.

13. The method of claim 11, wherein the flow ribs extend progressively further from the surface of the inner sleeve.

14. The method of claim 11, wherein the flow ribs extend perpendicularly from the surface of the inner sleeve.

15. The method of claim 11, wherein the flow ribs extend from the surface of the inner sleeve at an angle.

16. The method of claim 11, wherein the flow ribs are separate and parallel to each other.

17. The method of claim 11, wherein the flow ribs are formed from at least one spiral rib extending from the outer surface of the inner sleeve.

18. The method of claim 11, wherein the EGR loop is a dedicated EGR loop.

19. The method of claim 11, wherein the flow ribs extend completely across the space and have openings for allowing EGR gas to flow through the flow ribs.

* * * * *